(12) United States Patent
Choi et al.

(10) Patent No.: US 7,364,340 B2
(45) Date of Patent: Apr. 29, 2008

(54) BACKLIGHT UNIT FOR FLAT PANEL DISPLAY AND FLAT PANEL DISPLAY APPARATUS HAVING THE SAME

(75) Inventors: Yoon-sun Choi, Incheon-si (KR); Jin-Seung Choi, Suwon-si (KR); Jee-hong Min, Yongin-si (KR); Jin-hwan Kim, Suwon-si (KR); Su-mi Lee, Hwaseong-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 11/412,843

(22) Filed: Apr. 28, 2006

(65) Prior Publication Data

US 2006/0285185 A1 Dec. 21, 2006

(30) Foreign Application Priority Data

Jun. 18, 2005 (KR) ...................... 10-2005-0052726

(51) Int. Cl.
*F21V 7/04* (2006.01)
(52) U.S. Cl. ...................... 362/619; 362/606; 362/617; 362/620; 362/623; 362/625; 362/626; 362/628; 362/629
(58) Field of Classification Search ................ 362/628, 362/619, 615, 600, 31, 606, 617, 620, 623, 362/625, 626, 629; 359/15
See application file for complete search history.

(56) References Cited

U.S. PATENT DOCUMENTS

| | | | |
|---|---|---|---|
| 6,011,602 A * | 1/2000 | Miyashita et al. | ............ 349/65 |
| 7,044,628 B2 * | 5/2006 | Choi et al. | .................. 362/628 |
| 2004/0246743 A1 | 12/2004 | Lee et al. | |
| 2005/0002174 A1 * | 1/2005 | Min et al. | ...................... 362/31 |

FOREIGN PATENT DOCUMENTS

EP 1016817 A1 7/2000

OTHER PUBLICATIONS

Moharam M G et al: "Stable Implementation of the Rigorous Coupled-Wave Analysis for Surface-Relief Gratings: Enhanced Transmittance Matrix Approach", Journal of the Optical Society of America, Washington, U.S., vol. 12, No. 5, May 1995 pp. 1077-1086, ISSN: 1084-7529.

(Continued)

*Primary Examiner*—Sharon E. Payne
*Assistant Examiner*—Jessica L McMillan
(74) *Attorney, Agent, or Firm*—Sughrue Mion, PLLC (57) ABSTRACT

A backlight unit for a flat panel display and a flat panel display apparatus having the same. The backlight unit for a flat panel display displaying a predetermined image includes: a light source which emits light; a light guide panel having an incident surface facing the light source and which totally reflects light incident through the incident surface toward the flat panel display; and a holographic pattern that includes a plurality of diffraction gratings that are continuously repeated on at least one of an exit surface of the light guide panel and the opposing surface and diffracts light incident into the light guide panel. A depth of the diffraction grating progressively increases away from the incident surface along a length direction of the light guide panel. The backlight unit for a flat panel display and the flat panel display apparatus having the same have a simple structure that can acquire surface light using a holographic pattern while achieving uniform brightness distribution across the entire light-emitting surface.

16 Claims, 9 Drawing Sheets

OTHER PUBLICATIONS

Viswanathan N K et al: "Surface relief structures on azo polymer films", Journal of Materials Chemistry, The Royal Society of Chemistry, Cambridge, GB, vol. 9, 1999, pp. 1941-1955, ISSN: 0959-9428.

Min J H et al: "Holographic backlight unit for mobile LCD devices", Journal of the Society for Information Display Soc. Inf. Display USA, vol. 11, No. 4, 2003, pp. 653-657, ISSN: 1071-0922.

* cited by examiner

BACKLIGHT UNIT FOR FLAT PANEL DISPLAY AND FLAT PANEL DISPLAY APPARATUS HAVING THE SAME

CROSS-REFERENCE TO RELATED PATENT APPLICATION

This application claims priority from Korean Patent Application No. 10-2005-0052726, filed on Jun. 18, 2005, in the Korean Intellectual Property Office, the disclosure of which is incorporated herein in its entirety by reference.

BACKGROUND OF THE INVENTION

1. Field of the Invention

The present invention relates to a backlight unit for a flat panel display and a flat panel display apparatus having the same and, more particularly, to a backlight unit for a flat panel display with a uniform brightness gradient across the entire light-emitting surface and a flat panel display apparatus having the same.

2. Description of the Related Art

Unlike self-emissive flat panel displays, non-emissive flat panel displays, such as liquid crystal display (LCD) panels, need external light to produce an image. Thus, a backlight unit is located behind a non-emissive flat panel display and illuminates light on the flat panel display such as an LCD panel in order to produce an image. The backlight unit for the flat panel display is used as a backlight unit for an LCD device or a surface light source system such as an illuminating sign.

Backlight units are classified, as either direct light type backlight units or edge light type backlight units according to the position in which a light source is arranged. A point light source having an approximately point-shaped light-emitting portion or a linear light source having a linear light-emitting portion disposed along one direction may be used as a light source for an edge light type backlight unit. Representative examples of the linear light source and point light source are a cold cathode fluorescent lamp (CCFL) having two electrodes at opposite ends within a tube and a light emitting diode (LED) (or laser diode), respectively.

Figure 1:
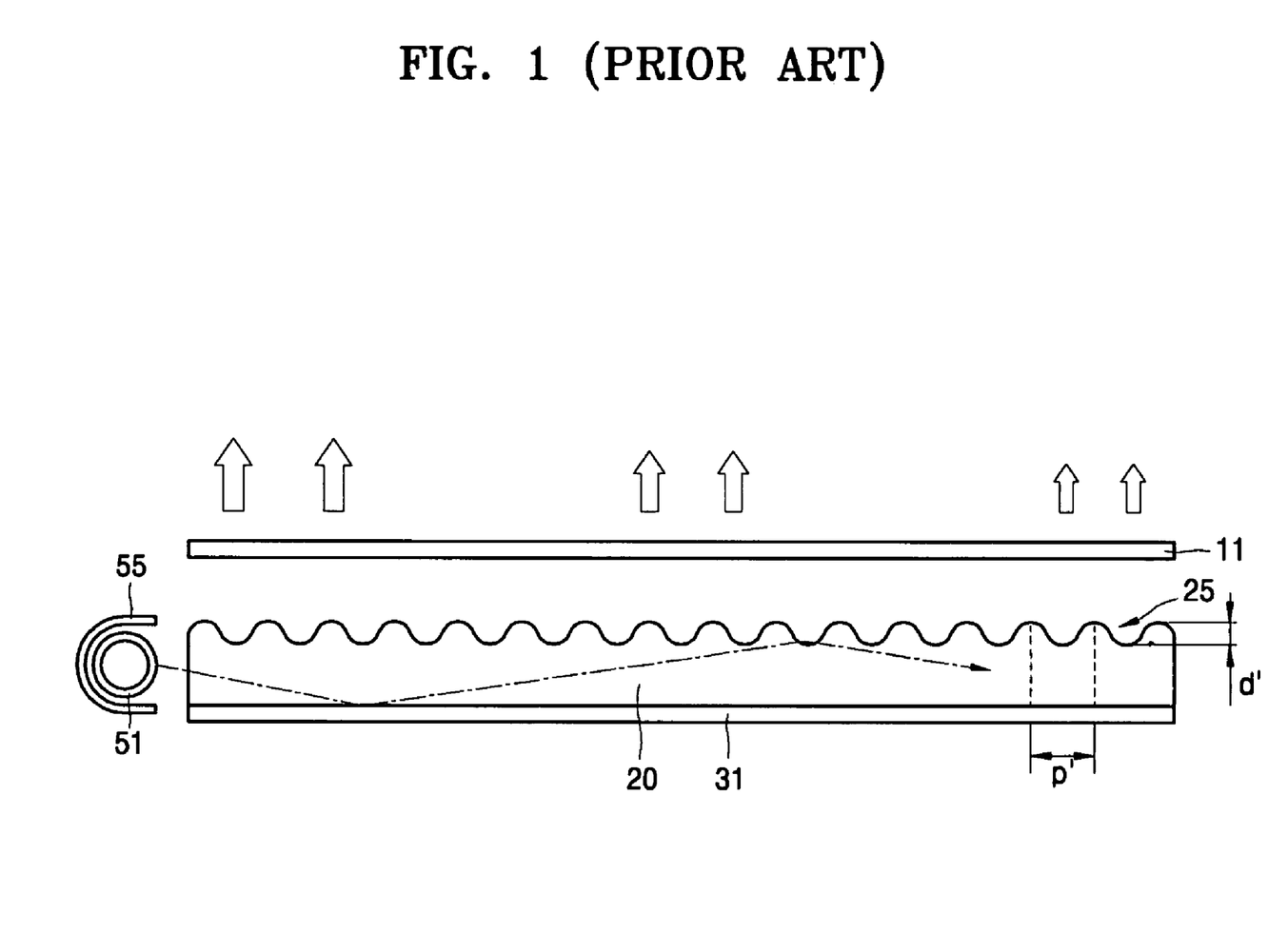
FIG. 1 is a schematic cross-sectional view of a backlight unit disclosed in the Korean Laid-open Patent Publication No. 2003-4021.

Korean Laid-open Patent Publication No. 2003-4021 discloses a backlight unit for a flat panel display using a planar hologram filed by an applicant of the present invention. FIG. 1 is a schematic cross-sectional view of the disclosed backlight unit. Referring to FIG. 1, the backlight unit includes a light source 51 disposed within a housing 55, a light guide panel (LGP) 20 for guiding light emitted by the light source 51 by the use of total reflection, a reflective member 31 that is disposed below the LGP 20 and upwardly reflects light escaping from the LGP 20, and a transmissive diffusion sheet 11 that is disposed above the LGP 20 and widely diffuses light escaping upward from the LGP 20. The LGP 20 has a holographic pattern 25 repeated continuously with a grating period p' at a top surface thereof. The light incident on the LGP 20 is totally internally reflected into the LGP 20 by top and bottom surfaces thereof and propagates along the LGP 20. Some of light directed onto the holographic pattern 25 is diffracted upward by the holographic pattern 25 and escapes approximately perpendicular to the LGP 20. A light beam guided by the LGP 20 escapes sequentially as the distance from the light source 51 increases so the amount of light beam propagating along the LGP 20 decreases away from the light source 51. That is, a large amount of light is incident onto a holographic grating close to the light source 51 but the amount of light directed onto the holographic grating progressively decreases away from the light source 51.

In a conventional backlight unit, the holographic pattern 25 is formed in a regular pattern that is continuously repeated over the entire surface of the LGP 20 with a grating period p' and a depth d' and has a fixed pattern regardless of the distance from the light source 51. Thus, diffraction efficiency defined as the ratio of the amount of light diffracted by the holographic pattern 25 to the amount of light directed onto the holographic pattern 25 is maintained constant over the entire light-emitting surface of the LGP 20 and the amount of light escaping through the LGP 20 decreases as the distance from the light source 51 increases.

Figure 2:
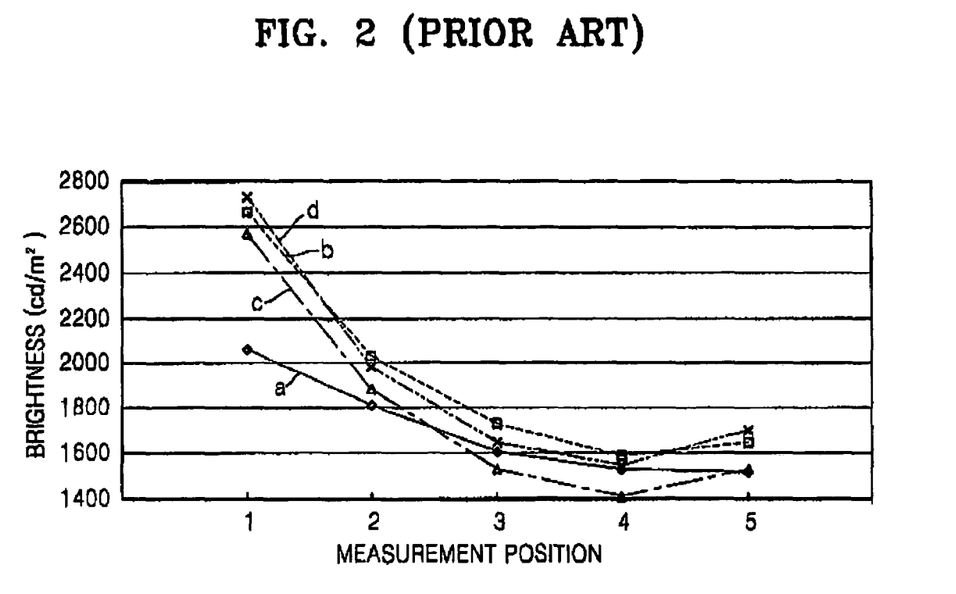
FIG. 2 shows brightness distribution for a conventional backlight unit for a flat panel display.

FIG. 2 illustrates the profiles of a brightness distribution for a conventional backlight unit for a flat panel display. Each profile shows brightness data for five measurement positions in an LGP partitioned according to the distance from a light source. The measurement positions have no units because the measurement positions 1 through 5 can be understood as points spaced apart by the same distance. Thus, "1" may be the point located at the front end of the LGP, and "5" may be the point located at the rear end of the LGP. The LGP has a fixed pattern to maintain diffraction efficiency constant. More specifically, the profiles a, b, c and d respectively show brightness distributions when LGPs having fixed diffraction efficiencies of 3%, 6%, 9%, and 11% are applied. As evident from FIG. 2, in all cases, as the distance from the light source increases, brightness level significantly decreases. Brightness uniformity which is defined as the percentage of minimum to maximum brightness level is only about 58%. There is much room for improvement. Because emission brightness obtained from the backlight unit has a large variation depending on measurement position, a flat panel display apparatus employing the backlight unit suffers a variation in brightness level depending on position on a display surface and a blemish in brightness, thus providing degraded image quality and display performance.

SUMMARY OF THE INVENTION

The present invention provides a backlight unit having a simple structure that can acquire surface light that exits perpendicularly to the surface of the backlight unit and with uniform brightness distribution across the entire light-emitting surface and a flat panel display apparatus having the same.

According to an aspect of the present invention, there is provided a backlight unit for a flat panel display displaying a predetermined image, including: a light source emitting light; a light guide panel having an incident surface facing the light source and which totally reflects light incident through the incident surface toward the flat panel display; and a holographic pattern that includes a plurality of diffraction gratings that are continuously repeated on at least one of an exit surface of the light guide panel and an opposing surface and diffracts light incident into the light guide panel. A depth of the diffraction gratings progressively increases away from the incident surface along a length direction of the light guide panel.

The depth of the diffraction gratings may increase continuously or stepwise along the light guide panel. The depth of the diffraction gratings may vary in the range of 10 to 500 nm.

The holographic pattern is formed by continuously repeating diffraction gratings with a predetermined period and the predetermined period may be in the range of 300 to 500 nm. The diffraction gratings may have a sine wave or rectangular wave shape.

The backlight unit may further include a transmissive diffusion plate that is located in front of the exit surface of the light guide panel and transmits and diffuses light escaping from the light guide panel and a reflective member disposed at a surface opposite to the exit surface of the light guide panel and reflecting light escaping from the light guide panel toward a display direction.

The light source may include a plurality of light sources arranged along the incident surface of the light guide panel or be a linear light source having a line-shaped light-emitting portion disposed along the incident surface of the light guide panel.

According to another aspect of the present invention, there is provided a flat panel display apparatus for displaying a predetermined image, which includes a flat panel display and a backlight unit irradiating light on the flat panel display, wherein the backlight unit includes: a light source emitting light; a light guide panel having an incident surface facing the light source and which totally reflects light incident through the incident surface toward the flat panel display; and a holographic pattern that includes a plurality of diffraction gratings that are continuously repeated on at least one of an exit surface of the light guide panel and the opposing surface and diffracts light incident into the light guide panel. A depth of the diffraction gratings progressively increases away from the incident surface along a length direction of the light guide panel.

The depth of the diffraction gratings may increase continuously or stepwise along the light guide panel. The depth of the diffraction gratings may vary in the range of 10 to 500 nm. The holographic pattern is formed by continuously repeating diffraction gratings with a predetermined period and the predetermined period may be in the range of 300 to 500 nm. The diffraction gratings may have a sine wave or rectangular wave shape. The backlight unit may further include a transmissive diffusion plate that is located in front of the exit surface of the light guide panel and transmits and diffuses light escaping from the light guide panel and a reflective member disposed at a surface opposite to the exit surface of the light guide panel and reflecting light escaping from the light guide panel toward a display direction.

BRIEF DESCRIPTION OF THE DRAWINGS

The above and other features and advantages of the present invention will become more apparent by describing in detail exemplary embodiments thereof with reference to the attached drawings, in which.

DETAILED DESCRIPTION OF ILLUSTRATIVE, NON-LIMITING EMBODIMENTS OF THE INVENTION

Figure 3:
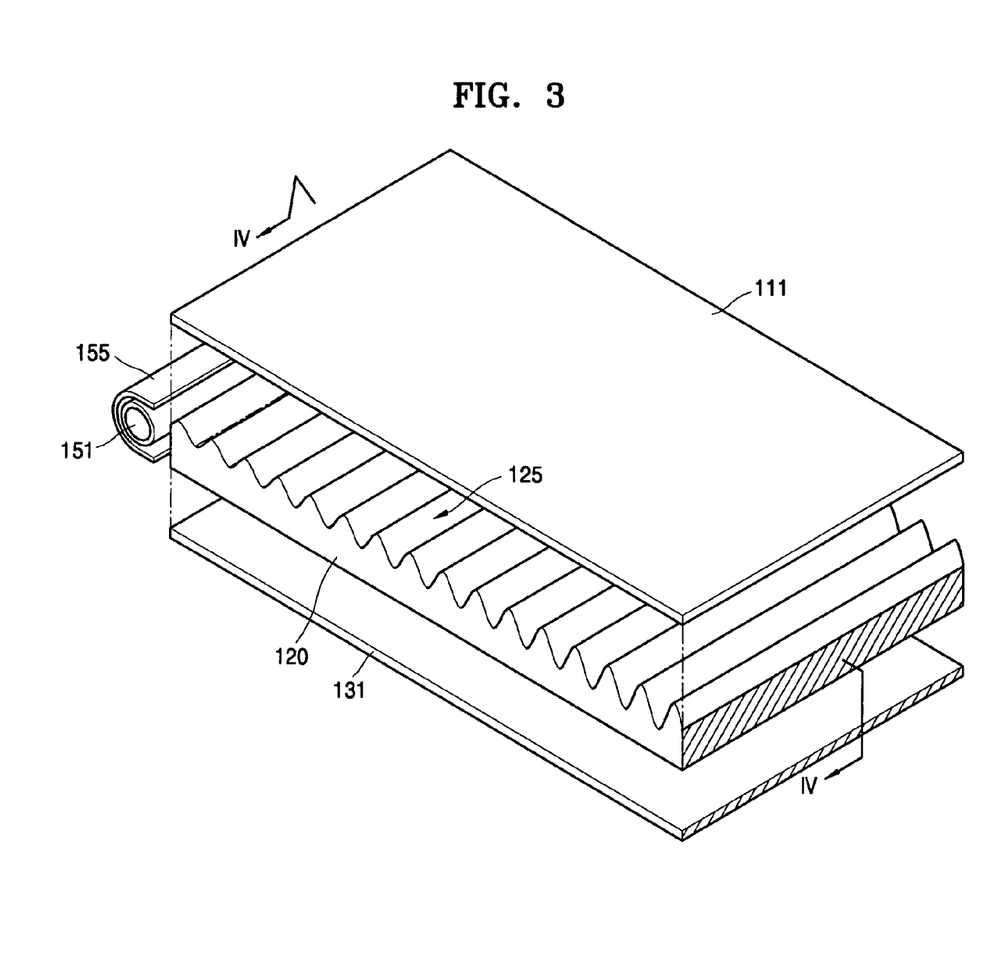
FIG. 3 is an exploded perspective view of a backlight unit for a flat panel display according to a first embodiment of the present invention.
Figure 4:
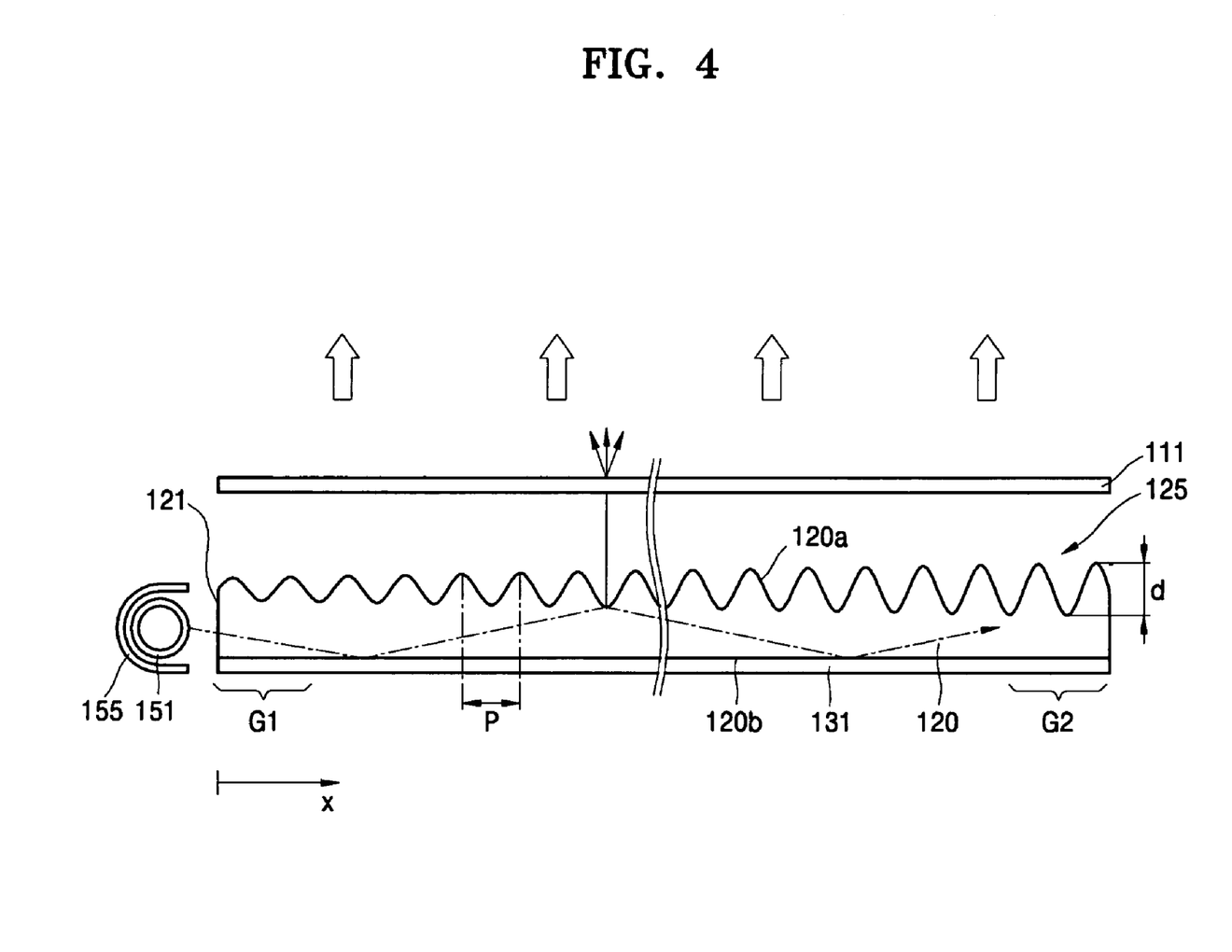
FIG. 4 is a cross-sectional view taken along line IV-IV of the backlight unit of FIG. 3.
Figure 9:
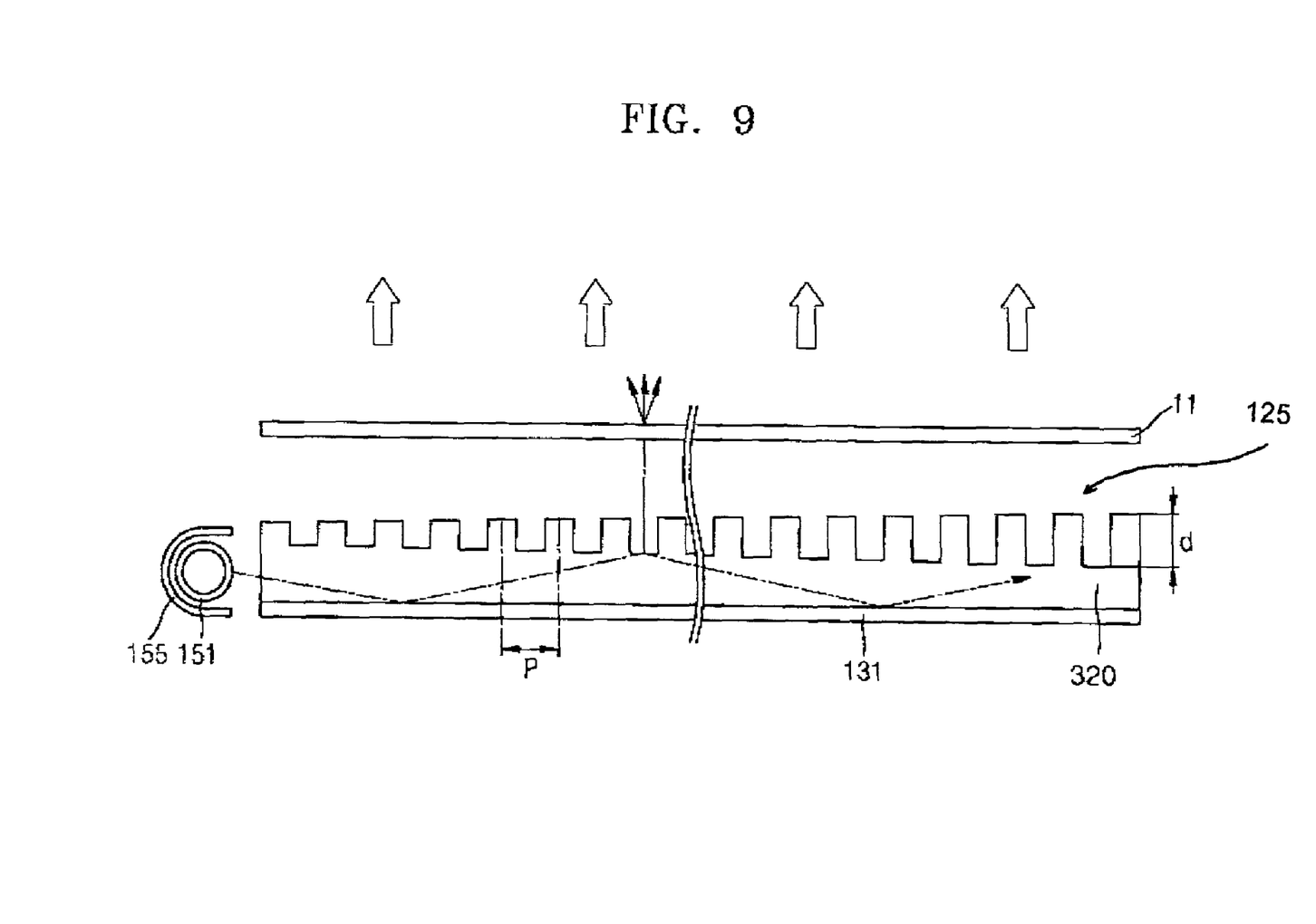
FIG. 9 is a cross-sectional view of a backlight unit for a flat panel display according to an exemplary embodiment of the present invention.

A backlight unit for a flat panel display and a flat panel display apparatus having the same according to illustrative, non-limiting embodiments of the present invention will now be described in detail with reference to the accompanying drawings. FIGS. 3, 4 and 9 show an edge light type backlight unit as a backlight unit for a flat panel display according to a first embodiment of the present invention. Referring to FIG. 3, the backlight unit for a flat panel display includes a light source 151 producing and emitting light and a light guide panel (LGP) 120 totally internally reflecting light emitted by the light source 151 on one side so that the light can propagate to the other side. The LGP 120 has a holographic pattern 125 diffracting light upward at a top surface thereof.

The light source 151 may be a white light source supplying white light of multiple wavelengths. In the present embodiment, the light source 151 may be a linear light source having a line-shaped light-emitting portion such as Cold Cathode Fluorescent Lamp (CCFL). The light source 151 is installed within a light source housing 155 and some of light beams emitted by the light source 151 are reflected by the housing 155 and guided into the LGP 120.

A light beam emitted by the light source 151 is incident into the LGP 120 via an incident surface 121 that is a side surface of the LGP 120 and is totally internally reflected and propagates inside the LGP 120. The LGP 120 is made of a transparent material that can transmit the incident light beam. A commonly used material for the LGP 120 is a transparent acrylic-based resin having a refractive index of 1.49 and specific gravity of about 1.19, such as polymethyl methacrylate (PMMA), or transparent olefin-based resin with a specific gravity of 1.0 to achieve a light weight. The LGP 120 may have a thickness of about 0.6 to 3 mm.

Light incident into the LGP 120 is totally reflected by a bottom surface 120b and a top surface 120a opposite the bottom surface 120b of the LGP 120 and propagates in a zigzag pattern. The LGP 120 has the holographic pattern 125 at either or both the top and bottom surfaces 120a and 120b. The holographic pattern 125 diffracts incident light approximately perpendicular to a planar surface of the LGP 120. In the present embodiment, the holographic pattern 125 is formed at the top surface of the LGP 120 and light diffracted by the holographic pattern 125 escapes through an exit surface that is the top surface 120a of the LGP 120. The exit surface refers to either of the opposing main surfaces 120a and 120b closer to the flat panel display such as a liquid crystal panel. The light escaping through the exit surface becomes effective light that can be directly emitted onto an image display unit. A reflective member 131 may be disposed beneath the bottom surface 120b of the LGP 120.

Light incident on the reflective member 131 is reflected by the reflective member 131 into the LGP 120 regardless of whether the conditions for total reflection are satisfied.

The holographic pattern 125 may be formed by repeating rectangular wave or sine wave diffraction gratings with a predetermined grating period P as shown in FIG. 4 and 9. The grating period P can be determined by the wavelength and angle of light being incident on the holographic pattern 125. The refractive index of the LGP 120 is about 1.5 and the critical angle for total reflection is about 41.8®. For example, when green light having a 540 nm wavelength is incident on the holographic pattern 125 at an angle of 60°, the grating period P with which green light can be diffracted perpendicular to the exit surface is about 440 nm. An incident angle may vary depending on the refractive index of the LGP 120 or incident wavelength of a light source. The wavelength of the incident light may vary depending on the type of the light source. The grating period P of the holographic pattern 125 may be suitably designed considering the size of the LGP 120 and the wavelength of the light source and determined in the range of 300 to 500 nm.

The holographic pattern 125 changes the propagation path of light so that the light escapes from the LGP 120 approximately perpendicular to the planar surface of the LGP 120, thereby causing the light emitted by the linear light source 151 to be converted into surface light. Some of the light incident on the holographic pattern 125 under the conditions for total reflection is totally internally reflected back into the LGP 120 and propagates inside the LGP 120.

The grating depth d of the holographic pattern 125 formed at the top surface of the LGP 120 continuously varies depending on the distance x from the incident surface 121. That is, the grating depth d progressively decreases as the distance from the incident surface 121 decreases. The grating depth d progressively increases as the distance from the incident surface 121 increases. Because the holographic pattern 125 has the grating depth d that varies depending on position, the efficiency of diffraction by the holographic pattern 125 varies depending on the distance from the light source 151. As in the prior art, when a holographic pattern is formed with a fixed grating depth, it has constant diffraction efficiency regardless of position. As shown in FIG. 2, in this case, the amount of light escaping through an LGP decreases in a direction away from a light source because the amount of light directed onto the holographic pattern progressively decreases in the direction the light propagates through the LGP. That is, since a light beam propagating along the LGP escapes sequentially through the holographic pattern, a large amount of a light beam is directed onto a grating close to the light source but the amount of light beam directed onto the holographic pattern progressively decreases in a direction away from the light source. The amount of light escaping from the LGP having a constant diffraction efficiency decreases progressively, thus causing a variation in brightness level depending on the position on a display surface and a blemish in brightness. This results in degradation of image quality. Thus, an apparatus consistent with the present invention is intended to provide uniformity in the amount of exit light by allowing the diffraction efficiency of the holographic pattern 125 to vary depending on the distance from the light source 151.

The present invention allows the diffraction efficiency of the holographic pattern 125 to have an increasing gradient in the direction of the LGP 120 along which light propagates, thereby compensating for a reduction in the amount of light due to sequential light emission while ensuring a constant amount of exit light. For example, in order to improve the conventional profile of the amount of exit light that decreases in a direction away from the light source, the present invention may allow the grating depth d to vary in such a way as to provide diffraction efficiency that is an inverse function of the profile, that is, to increase the diffraction efficiency as the distance from the light source 151 increases. Therefore, the amount of light exiting the LGP 120 has a uniform distribution despite a reduction in the amount of light due to sequential emission.

Consistent with the present invention, the grating depth d may have a minimum value of a few nanometers at an incident region G1 close to the light source 151 and a maximum value of a few hundred nanometers at a distal region G2 of the LGP 120. For example, the grating depth d may vary in the range of 10 to 500 nm and may be 60 nm and 250 nm at the incident and distal regions G1 and G2, respectively.

As shown in FIG. 4, a transmissive diffusion sheet 111 may be disposed above the LGP 120. While not being an essential component, the transmissive diffusion sheet 111 transmits and diffuses light exiting the LGP 120 in order to disperse light intensity across the entire display surface of the LGP 120, thereby contributing to image quality.

Figure 5:
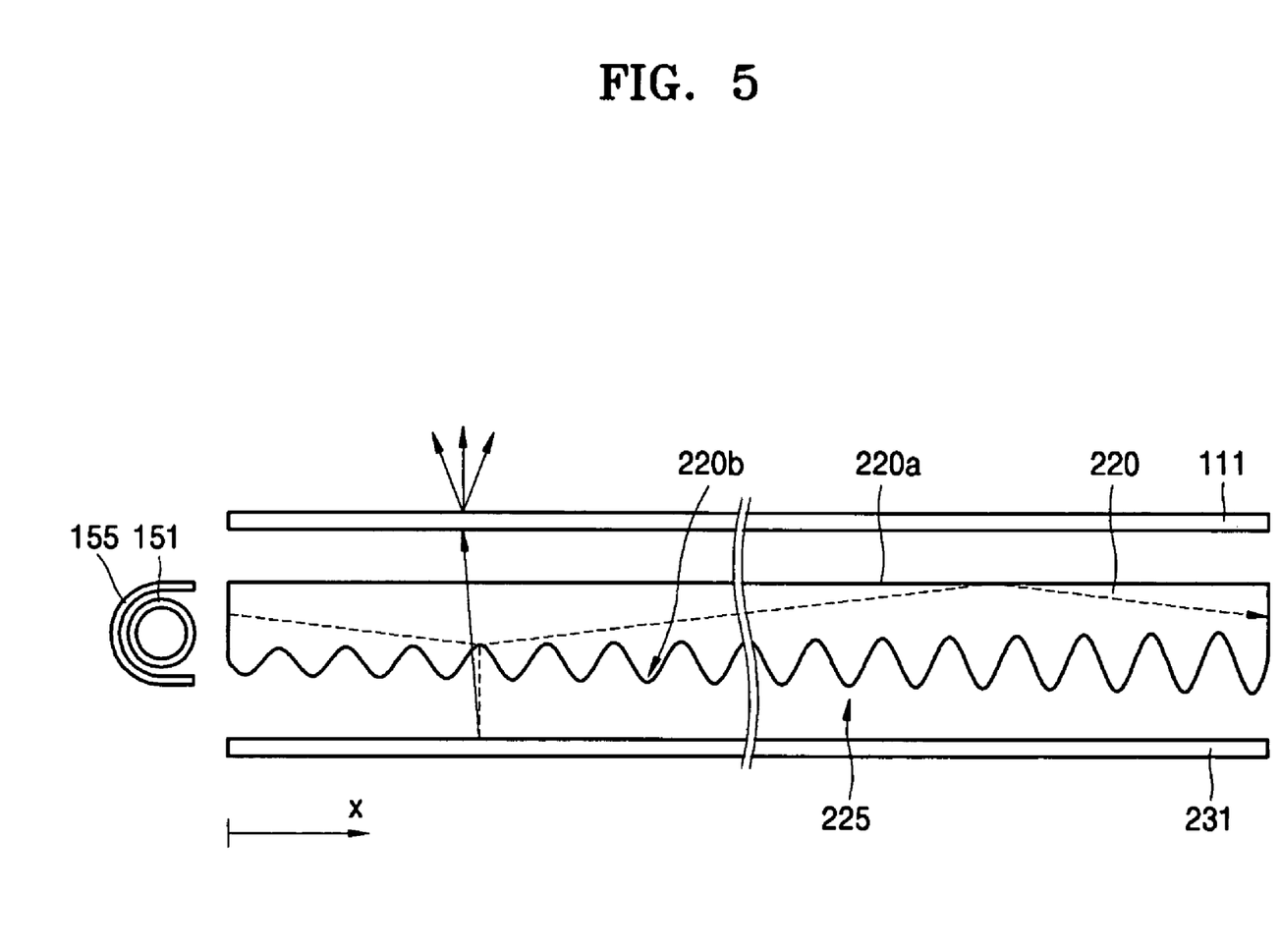
FIG. 5 shows a modified example of the backlight unit of FIG. 4.

The holographic pattern 125 may be formed at either or both the top and bottom surfaces 120a and 120b. As shown in FIG. 5, when a holographic pattern 225 is formed at a bottom surface 220b of a LGP 220, a refractive member 231 is disposed below the LGP 220 and reflects upward light diffracted by the holographic pattern 225. The light diffracted by the holographic pattern 225 is reflected by the reflective member 231 back to the holographic pattern 225. Some of the light is then incident back into the LGP 220 while the remaining light escapes through an exit surface that is a top surface 220a of the LGP 220.

A plurality of point light sources arranged at predetermined intervals along an incident surface of the LGP 120 (220) may be used instead Of the linear light source 151 shown in FIG. 3 The point light sources may be light-emitting diodes (LEDs) or laser diodes (LDs).

Figure 6:
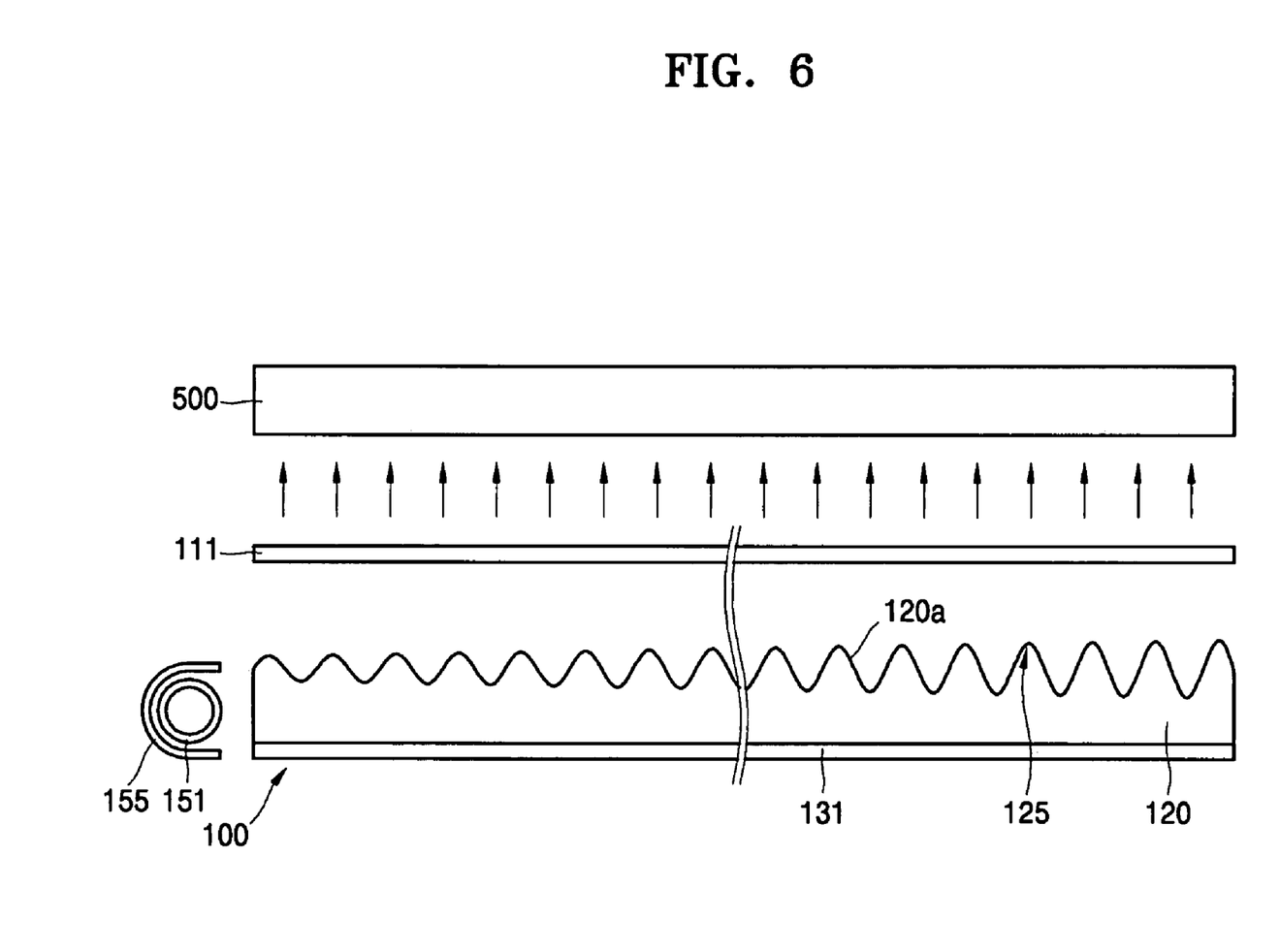
FIG. 6 schematically shows a flat panel display apparatus according to a preferred embodiment of the present invention.

FIG. 6 is a cross-sectional view of a flat panel display apparatus according to an exemplary embodiment of the present invention. An LCD apparatus is used as the flat panel display apparatus. The flat panel display apparatus includes the backlight unit 100 and the flat panel display 500 located in front of the backlight unit 100. The backlight unit 100 and the flat panel display 500 are attached to face each other in a direction in which light escapes. The backlight unit 100 may be configured as shown in FIG. 3. When one linearly polarized beam is incident on a liquid crystal layer in a liquid crystal panel as the flat panel display 500, the polarization of the light passing through the liquid crystal layer is changed by changing the direction of a liquid crystal director with an electric field being applied, thereby enabling image information to be displayed on the liquid crystal panel. The liquid crystal panel is coupled to a driving circuitry. Since the detailed configuration of the liquid crystal panel and display operation using the driving circuitry are widely known in the art, their description will not be given. Because the backlight unit 100 according to the present invention irradiates uniform light over the entire screen of the flat panel display 500, the flat panel display apparatus employing the backlight unit can be implemented as a high quality display providing uniform brightness across the entire display surface. The present invention also provides a slim flat panel display apparatus by employing a backlight unit having a simple structure that can emit surface light.

Figure 7:
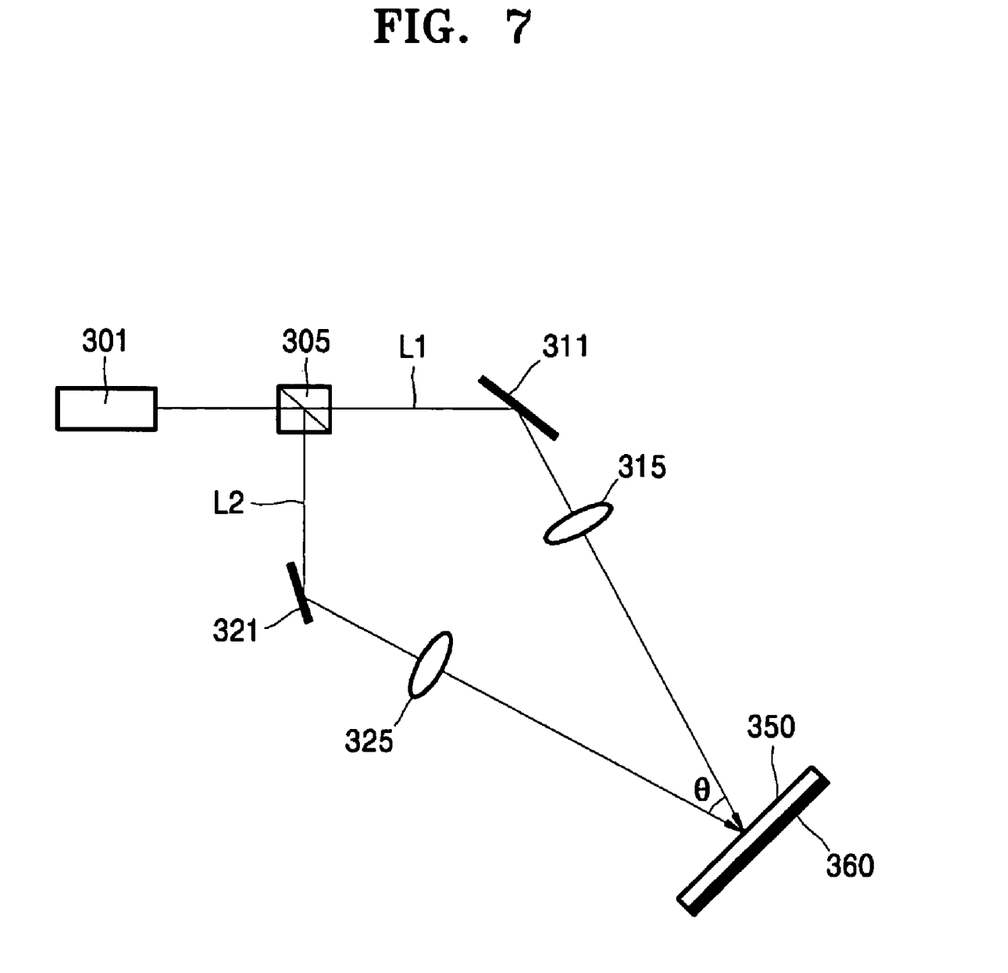
FIG. 7 schematically shows an interference optical system for forming the holographic pattern shown in FIG. 3.

FIG. 7 schematically shows an interference optical system for fabricating the holographic pattern 125 shown in FIG. 3. Referring to FIG. 7, the interference optical system includes a holographic material 360, a light source 301 emitting light on the holographic material 360, a beam splitter 305 that is disposed on an optical path between the holographic material 360 and the light source 301 and splits a light beam into two parts by transmitting part of the light beam emitted by the light source 301 and reflecting the remaining part of light beam, first and second mirror members 311 and 321 disposed on paths of the light beams that have passed through the beam splitter 305, and first and second spatial filters 315 and 325.

The light source 301 generating a light beam may be a He—Cd LD. The beam splitter 305 may be dichroically coated to transmit part of the light beam and reflect the remaining part of light beam. A part of the light beam ("first light beam") L1 emitted by the light source 301 is transmitted through a coated surface of the beam splitter 305 to the first mirror member 311 while the remaining part of the light beam ("second light beam") L2 is reflected by the coated surface of the beam splitter 305 to the second mirror member 321. The first light beam L1 whose propagation path is changed by the first mirror member 311 is incident on the holographic material 360 after passing through the first spatial filter 315. The spatial filter 315 removes high-dimensional noise from the light beam incident from the light source and shapes the resulting beam into a high purity beam.

The second light beam L2 reflected to the second mirror member 321 by the beam splitter 305 forms an interference pattern with the first light beam L1 on the holographic material 360 after passing through the second spatial filter 325. In this case, the interference pattern formed by the first and second light beams L1 and L2 is recorded on the holographic material 360. The holographic material 360 is exposed to the interference pattern through a photo mask 350 located in front thereof. The photo mask 350 may be a gray scale mask. After obtaining the interference pattern as a mold, the interference pattern is transferred to a LGP using injection molding, thereby allowing high volume production of LGPs having a holographic pattern formed thereon. An included angle θ between the first and second light beams L1 and L2 has a correlation with the period of a holographic pattern being fabricated and can be adjusted appropriately according to the predetermined period of the holographic pattern.

Figure 8:
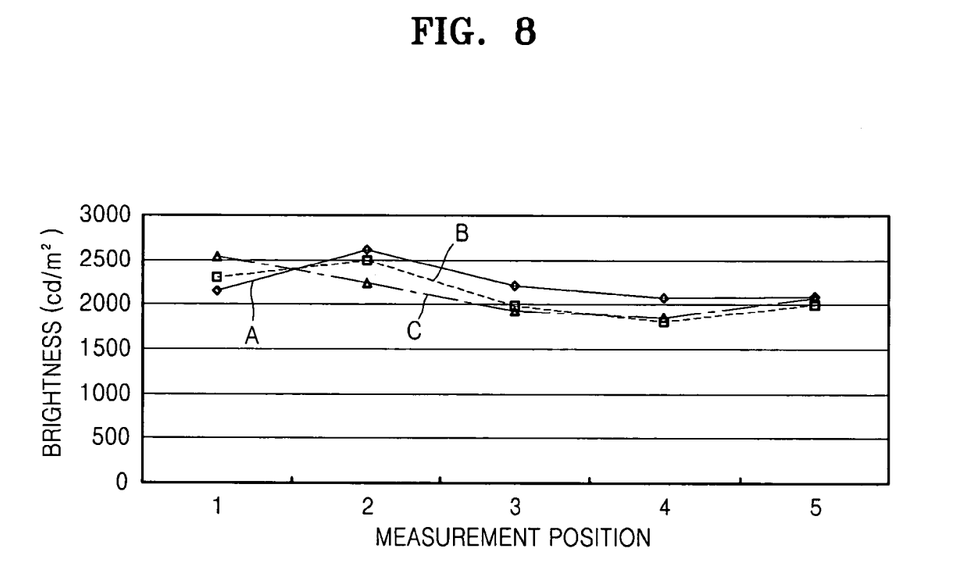
FIG. 8 illustrates brightness distribution for a backlight unit for a flat panel display according to the present invention.

FIG. 8 illustrates profiles of distributions of exit light measured on a backlight unit for a flat panel display consistent with the present invention. Each profile shows brightness levels measured for five measurement positions on an LGP partitioned along a length direction thereof (x direction in FIG. 4) (see also the discussion of the measurement positions above with respect to FIG. 2). The brightness level for each measurement position is computed as an average of brightnesses for three measurement points selected in a width direction The LGP has a continuously varying grating depth between a minimum grating depth at an incident region close to an incident surface, a maximum grating depth at a distal region farthest away from the incident surface. More specifically, profiles A, B, and C respectively show brightness distributions measured when the LGP has a grating depth of 60 to 300 nm, 70 to 300 nm, and 90 to 300 nm. The brightness has an approximately uniform distribution in the range of about 1,800 to 2,500 cd/m². The present invention improves the brightness uniformity compared to a conventional backlight unit with brightness significantly decreasing away from a light source as shown in FIG. 2. Brightness uniformity quantitatively defined as the percentage of lowest to highest brightness level is significantly increased from 58% to 87% that is a satisfactory level including an allowed margin when the allowed brightness uniformity is about 85%.

A backlight unit for a flat panel display and a flat panel display apparatus having the same consistent with the present invention have a simple structure that can provide surface light using a holographic pattern while improving uniformity in the amount of exit light by changing diffraction efficiency according to the distance from a light source. Thus, the present invention provides a high quality display with uniform brightness level across the entire display surface.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A backlight unit for a flat panel display displaying a predetermined image, the backlight unit comprising:
    a light source emitting light;
    a light guide panel having an incident surface facing the light source and which totally reflects light incident through the incident surface toward the flat panel display; and
    a holographic pattern that includes a plurality of diffraction gratings that are continuously repeated on at least one of an exit surface of the light guide panel and an opposing surface and diffracts light incident into the light guide panel,
    wherein a depth of the diffraction gratings progressively increases away from the incident surface along a length direction of the light guide panel.

2. The backlight unit of claim 1, wherein the depth of the diffraction gratings increases continuously or stepwise along the light guide panel.

3. The backlight unit of claim 1, wherein the depth of the diffraction gratings varies in the range of 10 to 500 nm.

4. The backlight unit of claim 1, wherein the holographic pattern is formed by continuously repeating diffraction gratings with a predetermined period and the predetermined period is in the range of 300 to 500 nm.

5. The backlight unit of claim 1, wherein the diffraction gratings have a sine wave or rectangular wave shape.

6. The backlight unit of claim 1, further comprising a transmissive diffusion plate that is located in front of the exit surface of the light guide panel and transmits and diffuses light escaping from the light guide panel.

7. The backlight unit of claim 1, further comprising a reflective member installed at a surface opposite to the exit surface of the light guide panel and reflecting light escaping from the light guide panel toward a display direction.

8. The backlight unit of claim 1, wherein the light source includes a plurality of light sources arranged along the incident surface of the light guide panel.

9. The backlight unit of claim 1, wherein the light source is a linear light source having a line-shaped light-emitting portion disposed along the incident surface of the light guide panel.

10. A flat panel display apparatus for displaying a predetermined image, which includes a flat panel display and a backlight unit irradiating light on the flat panel display, wherein the backlight unit comprises:

a light source emitting light;

a light guide panel having an incident surface facing the light source and which totally reflects light incident through the incident surface toward the flat panel display; and a holographic pattern that includes a plurality of diffraction gratings that are continuously repeated on at least one of an exit surface of the light guide panel and the opposing surface and diffracts light incident into the light guide panel, wherein a depth of the diffraction gratings progressively increases away from the incident surface along a length direction of the light guide panel.

11. The apparatus of claim 10, wherein the depth of the diffraction gratings increases continuously or stepwise along the light guide panel.

12. The apparatus of claim 10, wherein the depth of the diffraction gratings varies in the range of 10 to 500 nm.

13. The apparatus of claim 10, wherein the holographic pattern is formed by continuously repeating diffraction gratings with a predetermined period and the predetermined period is in the range of 300 to 500 nm.

14. The apparatus of claim 10, wherein the diffraction gratings have a sine wave or rectangular wave shape.

15. The apparatus of claim 10, wherein the backlight unit further comprises a transmissive diffusion plate that is located in front of the exit surface of the light guide panel and transmits and diffuses light escaping from the light guide panel.

16. The apparatus of claim 10, wherein the backlight unit further comprises a reflective member installed at a surface opposite to the exit surface of the light guide panel and reflecting light escaping from the light guide panel toward a display direction.

* * * * *